UNITED STATES PATENT OFFICE.

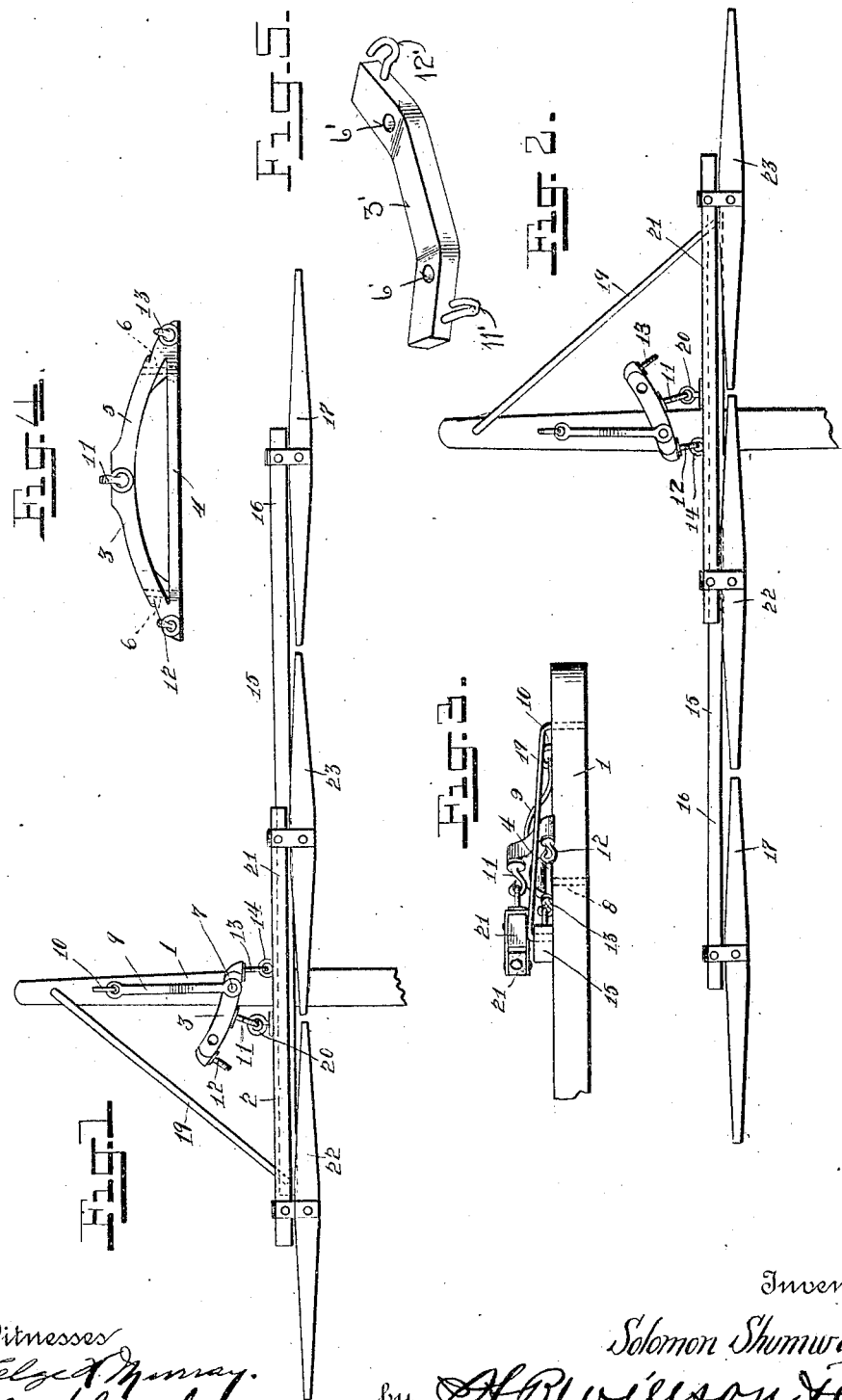

SOLOMON SHUMWAY, OF LE ROY, NEW YORK.

DRAFT-EQUALIZER.

No. 851,566.    Specification of Letters Patent.    Patented April 23, 1907.

Application filed November 28, 1906. Serial No. 345,478.

*To all whom it may concern:*

Be it known that I, SOLOMON SHUMWAY, a citizen of the United States, residing at Le Roy, in the county of Genesee and State of New York, have invented certain new and useful Improvements in Draft-Equalizers; and I do declare the following to be a full, clear, and exact description of the invention, such as will enable others skilled in the art to which it appertains to make and use the same.

This invention relates to improvements in draft equalizers, and more particularly to one adapted for equalizing the draft on three horses.

The object of the invention is to provide a device of this character which will be of simple, strong, durable and inexpensive construction, and which may be readily reversed, so that two of the animals may be caused to walk upon either side of the draft pole or tongue.

With the above and other objects in view, the invention consists of certain novel features of construction, combination and arrangement of parts, as will be hereinafter described and claimed.

In the accompanying drawings:—Figure 1 is a plan view of the improved three horse evener or equalizer; Fig. 2 is a similar view, showing the same reversed; Fig. 3 is a side elevation of the same; Fig. 4 is a front elevation of the evener bar or member; and Fig. 5 represents a front elevation of a modified form of evener bar.

The numeral 1 denotes the rear end of the draft tongue or pole of a vehicle or machine of any description, and 2 denotes the improved three horse draft equalizer or evener. This device comprises a reversible evener bar or member 3, which, as clearly shown in Fig. 4, is in the form of an open frame consisting of a flat bottom portion 4 and a curved or bow-shaped upper portion 5. The bar or member 3 has a slight longitudinal curvature and at equally distant points from its ends are vertical openings 6 to receive a pivot 7. The latter has its lower end seated in the tongue 1, as shown at 8 in Fig. 3, and its upper end engaged and braced by a metal strap 9. This strap 9 is curved longitudinally and has its rear end loosely secured by a staple or the like 10 upon the top of the draft tongue. The pin 7 may be inserted in either of the two openings 6, so that the bar or member 3 may be reversed as presently explained. Upon the front of this bar or member at its center and at each of its ends are arranged hooks 11, 12 and 13. Either of the hooks 12, 13 is adapted to be engaged by an eye 14 provided upon a draft bar 15 at a point about two-thirds of its length. This draft or evener bar 15 has mounted in the usual manner upon its long arm or end 16 a singletree 17 and its short arm or end 18 is connected by a rod or link 19 to the rear portion of the draft tongue 1. This connecting draft rod 19 has its ends bent at right angles and inserted in openings in the tongue 1 and bar 15, as seen in Fig. 3. The hook 11 is adapted to be engaged by an eye 20 upon the center of a double-tree 21, which latter has mounted upon its ends two singletrees 22, 23.

The operation of the invention will be readily seen upon reference to Figs. 1 and 2 of the drawings, in which Fig. 1 shows the evener arranged so that one horse is upon the right hand side of the tongue and the other two horses are upon the left-hand side, and Fig. 2 shows the parts reversed, that is, two of the singletrees upon the right-hand side and one upon the left-hand side. In reversing these parts it is necessary to change the pivot 7 from one of the openings 6 to the other, to swing over or invert the draft or evener bar 15 and to engage its eye 14 with the other of the two hooks 12, 13.

The evener bar shown in Fig. 5 is constructed from a single bar 3′ curved slightly longitudinally and having apertures as 6′ extending transversely therethrough a short distance from its ends to receive the pivot 7. Upon the front of this bar 3′ near each end are arranged hooks 11′ and 12′ either of which is adapted to be engaged by the eye 14 of the draft bar 15.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. In a device of the character described, the combination with a draft tongue, of a reversible evener member having pivot openings adjacent to its ends, a pivot engaged with one of said openings for connecting said member to said tongue, connecting elements at the center and at the ends of said member, a doubletree carrying swingletrees and having at its center a connecting element to engage the central connecting element on said member, an evener bar having a connecting element intermediate its ends to engage either of the connecting elements at the ends of said member, a swingletree upon the long arm of said evener bar, and a rod or link connecting the short arm of said evener bar to said tongue.

2. In a device of the character described, the combination with a draft tongue, of a reversible evener member having pivot openings adjacent to its ends, a pivot to engage either of said openings and connect said member to said tongue, a strap upon said tongue for bracing the outer end of said pivot, hooks arranged at the center and ends of said member, a doubletree carrying singletrees and having an eye at its center to engage the central hook on said member, an equalizing bar having an eye intermediate its ends to engage either of the end hooks on said member, a singletree upon the long arm of said equalizing bar and a link or rod connecting the short arm of said equalizing bar to said tongue, substantially as shown and for the purpose set forth.

In testimony whereof I have hereunto set my hand in presence of two subscribing witnesses.

SOLOMON SHUMWAY.

Witnesses:
    FRED A. LEWIS,
    SCOTT W. SKINNER.